L. CRYDER.
TRANSMISSION GEARING.
APPLICATION FILED MAY 15, 1914.
1,137,703.
Patented Apr. 27, 1915.
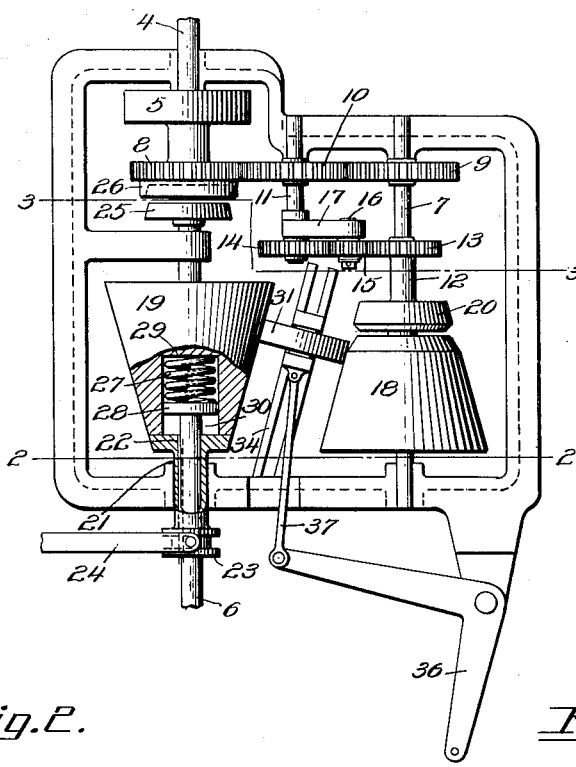
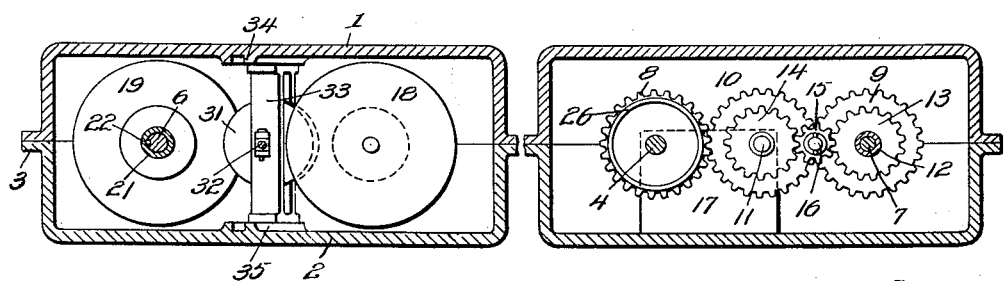
Witnesses
F. C. Gibson.
R. M. Smith.
Inventor
Lawrence Cryder.
By Victor J. Evans
Attorney

UNITED STATES PATENT OFFICE.

LAWRENCE E. CRYDER, OF MOUNT GILEAD, OHIO.

TRANSMISSION-GEARING.

1,137,703.   Specification of Letters Patent.   Patented Apr. 27, 1915.

Application filed May 15, 1914. Serial No. 838,863.

*To all whom it may concern:*

Be it known that I, LAWRENCE E. CRYDER, a citizen of the United States, residing at Mount Gilead, in the county of Morrow and State of Ohio, have invented new and useful Improvements in Transmission-Gearing, of which the following is a specification.

This invention relates to transmission gearing, the object of the invention being to produce simple and effective changeable speed gearing especially adapted for use in connection with automobiles, motor trucks and other motor propelled vehicles, the said mechanism embodying novel means whereby the machine may be driven in a forward direction at any desired speed between the highest and lowest points and whereby the machine may be reversed or driven in a backward direction, the mechanism also embodying means whereby the driving and driven shafts may be directly coupled or clutched together so as to rotate at the same speed.

With the above and other objects in view, the invention consists in the novel construction, combination and arrangement of parts, as will hereinafter be more fully described, illustrated and claimed.

In the accompanying drawings: Figure 1 is a plan view of the transmission gearing of this invention, the adjacent plate of the frame or casing being removed and one of the friction cones being shown partly in section. Fig. 2 is a cross section on the line 2—2 of Fig. 1. Fig. 3 is a cross section on the line 3—3 of Fig. 1.

The transmission gearing of this invention is shown as contained within a frame or casing which in the preferred embodiment thereof comprises a pair of oppositely located sections 1 and 2 flanged at 3 so that the sections may be bolted or otherwise fastened together. This enables suitable lubricant such as light or heavy grease or oil to be retained in said casing in accordance with the usual automobile practice. The said frame or casing is provided with suitable bearings for the various working parts hereinafter described in detail.

The driving element of the transmission consists of the shaft 4 which will ordinarily constitute the engine shaft, 5 representing the fly-wheel of the engine.

6 designates the driven shaft which is ordinarily termed the drive shaft of an automobile or motor truck, the last named shaft leading rearwardly to the differential gearing through which the rear or driving axle is actuated.

7 designates a countershaft which is parallel to both the driving and driven shafts 4 and 6, respectively, and said countershaft 7 is geared to and driven by the driving shaft 4 this being accomplished by means of spur gear wheels 8 and 9, respectively fast on the shafts 4 and 7 and an interposed spur gear or idler 10 which is mounted on a short intermediate shaft 11. This causes both the shafts 4 and 7 to rotate in the same direction.

A reversing shaft 12 is provided, the same being concentric with the countershaft 7 and being shown as of tubular form surrounding and journaled on the shaft 7. The tubular reversing shaft 12 is driven in the opposite direction from the shaft 4 and 7 by means of the spur gear wheels 13 and 14 fast respectively on the shafts 7 and 11 and an interposed spur gear or idler 15 mounted on a short shaft 16 which, together with the shaft 11, is journaled in a bearing bracket 17.

Reversely disposed friction cones 18 and 19 are mounted on the shafts 7 and 6, respectively, the cone 18 constituting the friction driving cone and the cone 19 constituting the friction driven cone. Mounted fast on the reversely revolving shaft 12 is a reversing friction cone 20 and therefore the cones 18 and 20 have coincident axes of rotation, the working face of the cone 20 being in alinement with the working face of the cone 18 to admit of the movement of the friction driving wheel hereinafter referred to being shifted from the cone 18 to the cone 20 and vice versa. The cone 19 is mounted slidingly on the driven shaft 6 and for that purpose is provided with a sleeve 21 which is keyed to the shaft 6 as shown at 22 so as to permit the cone 19 to slide longitudinally of the shaft 6 for a purpose which will appear. Exteriorly of the frame or casing, the sleeve 21 is provided with a grooved collar 23 to receive the fork of a clutch lever 24 which is manually controlled by the operator of the machine for the purpose of shifting the cone 19 lengthwise of the shaft 6.

Clutch mechanism is interposed between the driving shaft 4 and the driven shaft 6 as shown in Fig. 1, one of said shafts carrying a male cone 25 and the other shaft carrying a female cone 26, the two cones being yieldingly held in frictional engagement with each other by means of a coiled expansion spring 27 contained within a recess in the cone 19 as shown in Fig. 1 and being interposed between a head or shoulder 28 on the end of the shaft 6 and the inner end wall 29 of the recess 30 in the cone 19 in which said spring 27 is contained. When the manually controlled lever 24 is released, the spring 27 throws the clutch members 25 and 26 into coöperative relation to each other after which the driving and driven shafts rotate at the same speed, this being known as high speed or direct drive in automobile practice.

Interposed between and coöperating with the friction cones 18 and 19 is a friction transmission wheel 31 which serves to transmit the motion of the cone 18 to the cone 19 or under another adjustment from the cone 20 to the cone 19. The wheel 31 is carried by a shaft 32 supported by a runner 33 which is movable back and forth in parallel guides 34 and 35 shown in Fig. 2 as connected with or formed on the upper and lower sections 1 and 2 of the frame or casing. Movement is imparted to the runner 33 by means of a transmission wheel shifting lever 36 from which a connecting rod 37 extends to said runner. The runner travels in a plane substantially parallel to the adjacent working faces of the cones 18, 20 and 19 and it will now be seen by reference to Fig. 1 that the said friction wheel 31 may be shifted so as to coöperate simultaneously with the two cones 18 and 19 for driving the shaft 6 in the same direction as the shaft 4 or said wheel 31 may be shifted to such a position as to coöperate simultaneously with the cones 20 and 19 to drive the shaft 6 in the opposite direction from the shaft 4. On account of the difference in the diameters of the opposite ends of the cones 18 and 19 it will of course be understood that when the transmission wheel 31 is nearing the smaller end of the cone 18 as shown in Fig. 1, the shaft 6 will be driven at a comparatively low speed, whereas when said wheel 31 is shifted to the larger diameter of the wheel 18, it will coöperate with a correspondingly smaller portion of the cone 19 and drive the shaft 6 at a correspondingly increased speed. In the preferred embodiment of the invention, the cones 18 and 19 are so proportioned or, in other words, are of such relative diameters that when the transmission wheel 31 is working against the smaller portion of the cone 19, the shaft 6 will be driven at approximately the same speed as the shaft 4. At such a point, by means of the lever 24, the cone 19 may be released so that the spring 27 will throw the clutch members 25 and 26 into coöperation, the cone 19 in such movement being freed from frictional contact with the transmission wheel 31. This produces a direct drive between the driving shaft 4 and the driven shaft 6.

What I claim is:—

1. In transmission gearing, the combination of a frame, a driving shaft, a driven shaft, a countershaft geared to said driving shaft to rotate in the same direction as the latter, a reversing shaft concentric with said countershaft and geared to said driving shaft to rotate in the opposite direction, reversely disposed friction cones on said countershaft and driven shaft, a reversing friction cone on said reversing shaft, a friction transmission wheel interposed between and coöperating with said friction cones, and means for shifting said friction wheel along the working faces of said cones and from the cone on the countershaft to the reversing cone.

2. In transmission gearing, the combination of a frame, a driving shaft, a driven shaft, a countershaft geared to said driving shaft to rotate in the same direction as the latter, a reversing shaft concentric with said countershaft and geared to said driving shaft to rotate in the opposite direction, reversely disposed friction cones on said countershaft and driven shaft, a reversing friction cone on said reversing shaft having its working face alined with the working face of the cone on the countershaft, a friction transmission wheel interposed between and coöperating with said friction cones, and means for shifting said friction wheel along the working faces of said cones and from the cone on the countershaft to the reversing cone.

3. In transmission gearing, the combination of a frame, a driving shaft, a driven shaft, a countershaft geared to said driving shaft to rotate in the same direction as the latter, a reversing shaft concentric with said countershaft and geared to said driving shaft to rotate in the opposite direction, reversely disposed friction cones on said countershaft and driven shaft, a reversing friction cone on said reversing shaft, a friction transmission wheel interposed between and coöperating with said friction cones, means for shifting said friction wheel along the working faces of said cones and from the cone on the countershaft to the reversing cone, said driven shaft being shiftable longitudinally, and coöperating clutch members on said driving and driven members.

In testimony whereof I affix my signature in presence of two witnesses.

LAWRENCE E. CRYDER.

Witnesses:
L. H. ASHLEY,
W. M. KAUFMAN.